July 18, 1939.  I. S. MOSHER  2,166,260
DOUGHNUT CUTTER
Filed Dec. 22, 1938  3 Sheets-Sheet 1
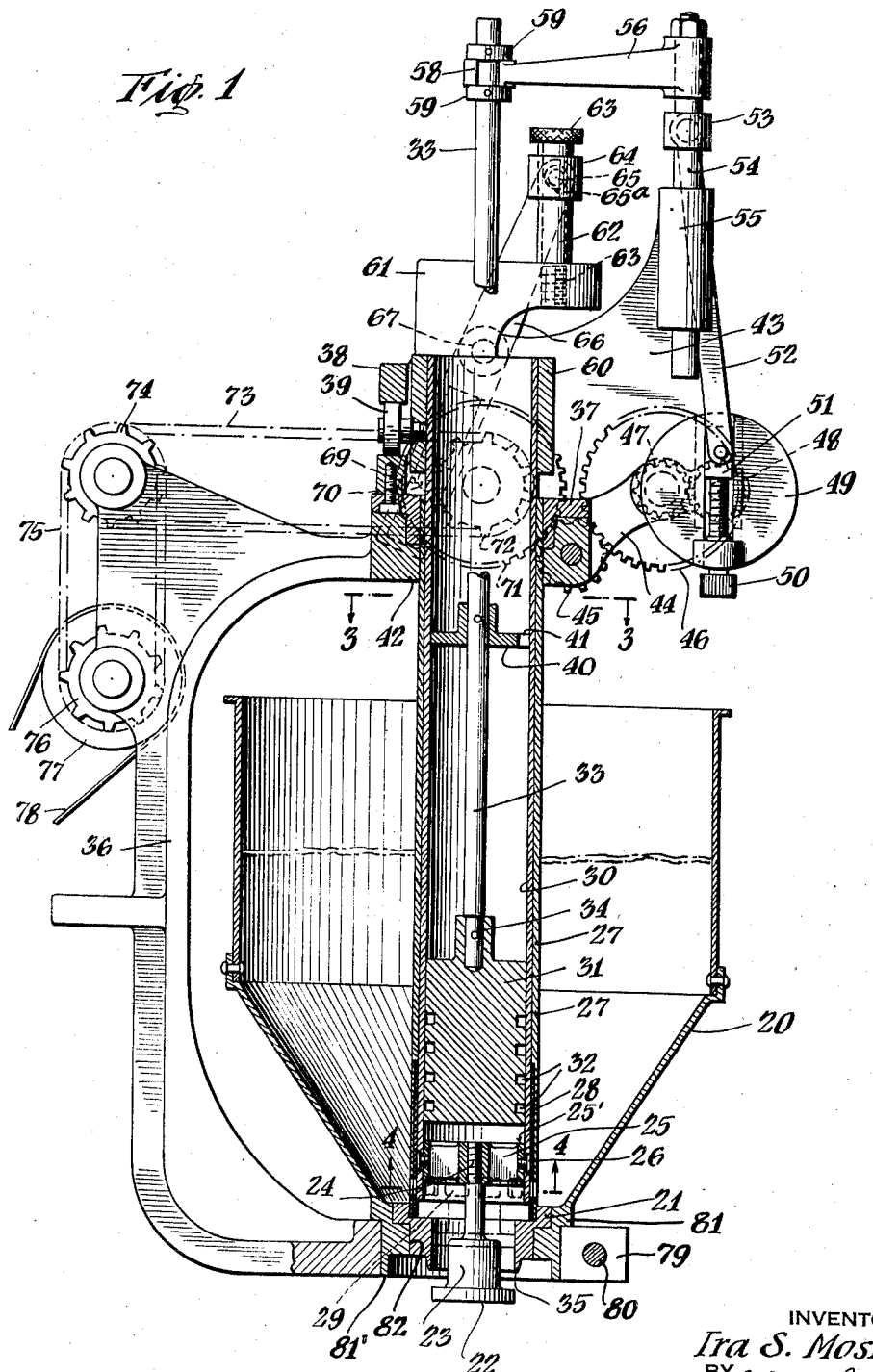
INVENTOR
*Ira S. Mosher*
BY *Charles A. Morton*
ATTORNEY July 18, 1939.  I. S. MOSHER  2,166,260
DOUGHNUT CUTTER
Filed Dec. 22, 1938   3 Sheets-Sheet 2
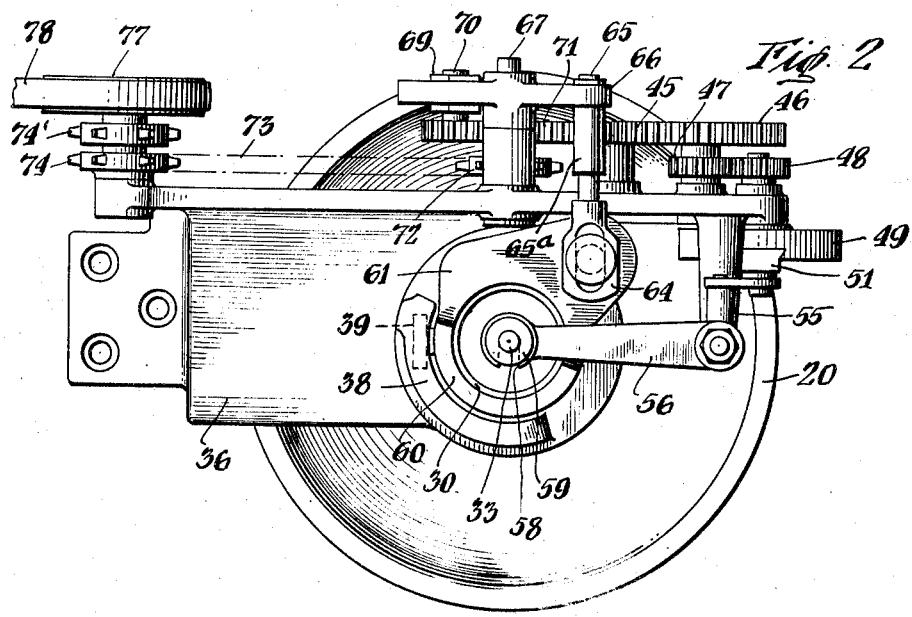
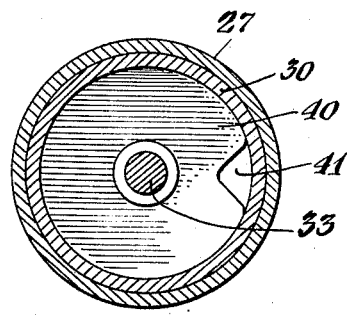
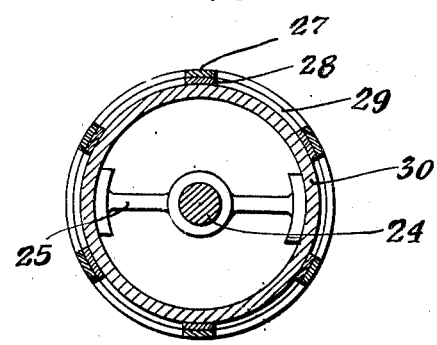
INVENTOR
*Ira S. Mosher*
BY
*Charles A. Morton*
ATTORNEY July 18, 1939.  I. S. MOSHER  2,166,260
DOUGHNUT CUTTER
Filed Dec. 22, 1938   3 Sheets-Sheet 3
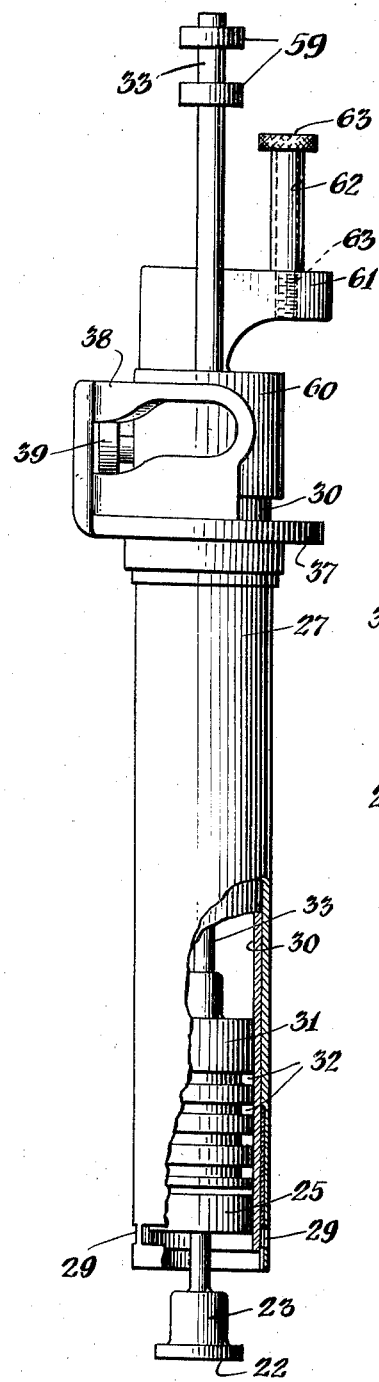
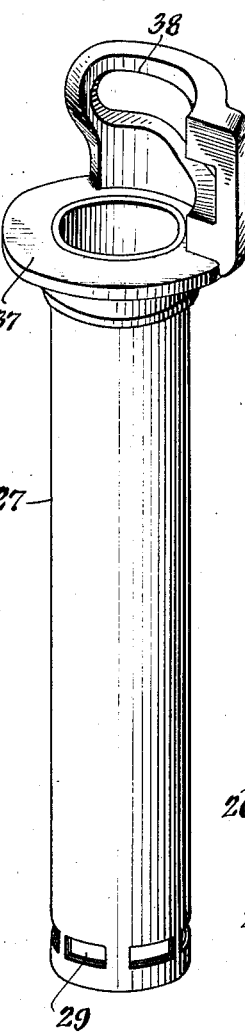
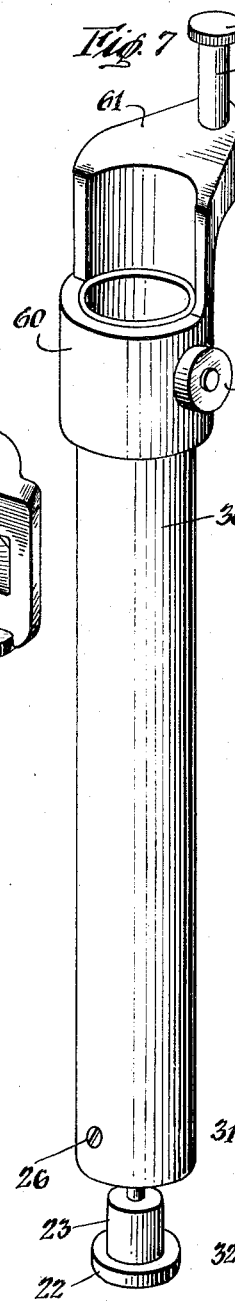
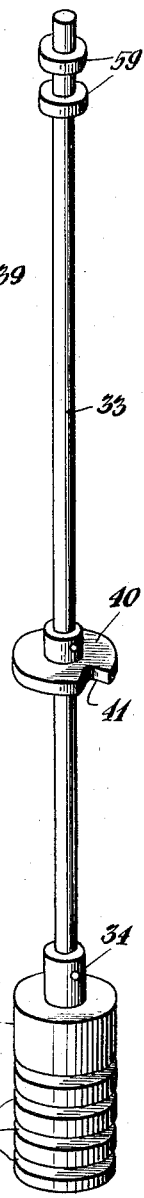
INVENTOR
Ira S. Mosher
BY Charles A. Morton
ATTORNEY Patented July 18, 1939

2,166,260

UNITED STATES PATENT OFFICE 2,166,260

DOUGHNUT CUTTER

Ira S. Mosher, East Orange, N. J.

Application December 22, 1938, Serial No. 247,167

4 Claims. (Cl. 107—14)

This invention relates to improvements in doughnut cutters.

The principal object of this invention is a doughnut cutter having all of the operating parts which extend into the dough hopper assembled in one single unit which can be rapidly removed from the dough hopper, dis-assembled, cleaned, re-assembled, and replaced in the dough hopper, without changing the adjustment of the doughnut cutter.

Another object is to produce doughnuts of uniform size and weight.

Another object is to reduce dough wastage to a minimum, and to prevent toughening of the dough.

Another object is finer regulation of the size and weight of the doughnut.

Another object is rapid removal, cleaning, and replacing, of the mechanical parts.

Other objects will appear from the detailed description which follows.

In the drawings comprising three sheets of eight figures numbered Figs. 1 to 8 inclusive—

Fig. 1 is a side view of the doughnut cutter showing certain of the parts in vertical section.

Fig. 2 is a top plan view of the assembled cutter.

Fig. 3 is a horizontal cross section taken along the line 3—3 of Fig. 1, looking in the direction of the arrows.

Fig. 4 is a horizontal cross section taken along the line 4—4 of Fig. 1, looking in the direction of the arrows.

Fig. 5 is a front view of the removable gun unit showing certain of the parts broken away and others in vertical section; and Figs. 6, 7 and 8 are perspective views of the several elements of the gun unit of Fig. 5 in exploded form.

Like reference characters designate corresponding parts throughout the several figures of the drawings.

The cutter assembly (Fig. 1) is sub-divided into three parts: a stationary frame whereon the necessary driving gears and sprockets are mounted; a hopper; and a gun unit (Fig. 5) adapted to be supported upon the stationary frame in correct registry with the hopper, and thereafter connected to the driving gears and sprockets carried by the stationary frame.

The stationary frame includes a supporting bracket 36, which carries the necessary driving gears and sprockets for operating the cutter. Frame 36 includes a lower arm for supporting hopper 20, and an upper arm 42 for supporting and guiding the gun unit (Fig. 5). Hopper 20 may be made of any suitable metal such as aluminum. The lower arm of frame 36 is provided with a split collar 79 having one section hinged (or otherwise movably mounted) upon the other to support and clamp the circular web 81 forming an integral part of the lower end of hopper 20. Web 81 is undercut to form an outer shoulder for abutting against split collar 79. Pin 80 locks split collar 79 to clamp web 81 and center hopper 20 in proper position in frame 36. The web 81 is provided with a central opening having an annular flange forming a seat for a steel cutting die 21. The orifice of the die 21 may be of any preferred shape, dependent upon the shape of doughnut desired; in the drawings a die having an annular orifice, for cutting ring doughnuts, is shown. Die 21 is provided with a bevelled cutting edge 35, for severing the formations of dough. The rim 81' of web 81 may project below the cutting edge 35 to protect said cutting edge from damage. Die 21 may be one of a series of interchangeable dies of various shapes and sizes; it is secured in web 81 by a pressed fit, thus tending to eliminate any leakage of air into hopper 20 between die 21 and web 81.

The gun unit (Fig. 5) is seated in the upper arm 42 of bracket 36 (Fig. 1), and is centered in die 21 of hopper 20, so that the stationary outer sleeve 27 of the gun unit is seated upon the seat formed by the annular flange at the enlarged upper end of die 21, the outer wall of sleeve 27 forming a snug fit against the side wall of die 21. At its upper end sleeve 27 carries a collar 37 which abuts against upper arm 42 to center sleeve 27 in die 21. Stationary outer sleeve 27 is preferably made of steel, but its lower end is bored out to receive a cast iron tubular insert or inner bushing 28, which is press fitted in stationary outer sleeve 27, the internal diameters of outer sleeve 27 and bushing 28 being identical. A series of elongated ports 29 (Figs. 5 and 6) are formed through the lower end of stationary outer sleeve 27 and cast iron bushing 28. These elongated ports which may be four in number are spaced far enough from the bottom end of outer sleeve 27 so as not to be covered by the circular side wall of die 21 when stationary sleeve 27 is properly seated in the opening formed in the upper end of the die (see Fig. 1).

The gun unit (Fig. 5) consists of the stationary outer sleeve 27 (Fig. 6), the inner sleeve 30 (Fig. 7) which is rotatably slidably mounted relative to stationary outer sleeve 27, and the piston 31

(Fig. 8) which is mounted for sliding movement within inner sleeve 30.

A steel disc valve is threadably suported in the H shaped spider 25 (Fig. 4), by means of a threaded valve stem 24. Spider 25 is detachably secured within inner sleeve 30 by means of a pair of counter-sunk screws 26 (Figs. 1 and 7).

An oscillating head 60 (Fig. 7) is press fitted upon the upper end of inner sleeve 30. A roller cam 39 is rotatably mounted (as in a ball race not shown) upon head 60. When inner sleeve 30 is mounted in outer sleeve 27, roller cam 39 engages inclined groove 38 attached to and forming a part of collar 37, to form a positively operated cam. An extension lug 61 forms an integral part of oscillating head 60. Bolt 63 carrying a rotatable sleeve 62, is threaded in extension lug 61. Thus when slotted head 64 of pin 65 driven by crank arm 66 is slipped over sleeve 62 (Figs. 1 and 2) and the crank arm is operated, inner sleeve 30 will be rotatably oscillated in outer sleeve 27, and as roller cam 39 is free to roll in the inclined groove 38 of the positive cam, the rotary oscillatory movement of inner sleeve 30 is translated into a compound up and around oscillatory movement, whereby sleeve 30 not only rotates, but also slides up and down within stationary outer sleeve 27 to alternately cover and uncover the elongated ports 29 formed in the lower end of stationary outer sleeve 27, and to alternately raise and lower the steel disc valve 22 carried by sleeve 30 relative to cutting die 21, to cause disc valve 22 to oscillate up and down into and out of the orifice of cutting die 21, thereby cutting off the extrusion of plastic dough and releasing the extruded ring of dough from the bevelled cutting edge 35 of the cutting die 21.

Aluminum plunger 31 (Fig. 8) is provided with a plurality of spaced circular grooves 32 which may be filled with frying fat for lubricating purposes, and to prevent siphoning of the dough between the walls of plunger 31 and inner sleeve 30, thus preventing the dough from creeping upwards in the inner sleeve and from either clogging plunger 31 or retarding its up and down movement in the inner sleeve. Plunger 31 is attached to piston rod 33 in any suitable manner as by means of a threaded connecting pin 34. A centering disc 40 is also secured upon piston rod 33 in spaced relation to plunger 31, and a vent port 41 is formed in centering disc 40 to maintain atmospheric pressure behind plunger 31 at all times. Any suitable means for detachably securing the upper end of piston rod 33 to its operating arm 56 may be provided, as for example, a pair of spaced collars 59—59 riveted or otherwise secured to the piston rod.

The inner sleeve 30 and piston rod 33 may be operated in proper timed relation in any suitable manner from gears and sprockets carried by supporting bracket 36. In Figs. 1 and 2 of the drawings one suitable form of mechanism is shown. It may consist of a chain drive 78, driven from an electric motor or other suitable source of power, for driving main sprocket 77, which in turn drives sprocket 76 which is mounted upon the same shaft. Sprocket 76 in turn drives a sprocket 72, in this case indirectly by means of link chain 75 driving sprocket 74', and link chain 73 driven by sprocket 74. Sprocket 72 in turn drives the gear train consisting of gear 71, idler gear 45, and gear 46. Gear 71 in turn operates oscillating arm 66 to rotatably oscillate inner sleeve 30; and idler gear 45 drives gear 46, which in turn drives intermeshing gears 47 and 48 to rotate crank throw regulating plate 49 thereby operating crank 52, driving rod 54, operating arm 56 and piston rod 33 to oscillate plunger 31.

The limits of the up and down movement of piston rod 33 are determined by the throw of crank arm 52, and this may be regulated by means of a sliding block 51 whose radial distance from the center of rotation of crank throw plate 49 is a variable which may be regulated by turning crank throw regulating pin 50. The opposite end of crank 52 is journalled to a collar 53 mounted upon driving rod 54, thus reciprocating driving rod 54 to raise and lower operating arm 56 which grips piston rod 33 between upper and lower collars 59—59. By loosening the lock-nut at the upper end of driving rod 54, operating arm 56 may be quickly dis-engaged from piston rod 33 thus facilitating rapid removal and replacement of the plunger 31.

Oscillating arm 66 which is pivoted at 67 to the upper arm of supporting bracket 36, controls the rotary movement of oscillating head 60. Arm 66 is in turn oscillated under control of a sliding block 69 which is rotatably mounted upon a stud 70 carried by the gear 71 (compare Figs. 1 and 2). As gear 71 rotates, it moves sliding block 69 supported on stud 70 back and forth along a guide-way formed in arm 66 (shown in dot and dash outline in Fig. 1), to impart oscillatory movement to said arm, then by way of pin 65 and its slotted head 64, sleeve 62, bolt 63, to extension lug 61 of oscillating head 60. Pin 65 forms a loose fit in sleeve 65a, which sleeve is press fitted in arm 66. The limits of the sliding movement of inner sleeve 30 in stationary outer sleeve 27 are determined by the pitch of the groove of positive cam 38. Outer sleeve 27 is secured to the upper arm of supporting bracket 36 by a machine screw (not shown) passing through collar 37 into seat 42.

The size (weight) of the doughnut ring is determined by the throw of crank arm 52 which is in turn determined by adjusting sliding block 51 by means of knurled crank throw regulating screw 50. No adjustment oscillating arm 66 or of gear 71 is possible, these adjustments are fixed and are not to be changed. The timing of the movement of aluminum plunger 31, of inner sleeve 30, and of disk valve 22, are determined by the positions of gears 71 and 46; and once these gears are properly set with respect to each other, idler gear 45 is locked in mesh with both gears and the timing cannot be changed unless idler gear 45 is first released and gears 71 and 46 rotated to different relative positions when timing may be varied to suit particular conditions. By making inner sleeve 30 and plunger 31 relatively adjustable, variations to meet particular local conditions of flour, water, and atmosphere, is made possible. At the limit of its downward movement, inner sleeve 30 must seal the ports 29 in stationary outer sleeve 27, but in this position the lower extremity of inner sleeve 30 must not be seated upon the seat formed by the flange of annular die 21, otherwise the cutter may not work properly but may tend to form a "cripple" (that is, an odd size of doughnut ring) at intervals. By raising inner sleeve 30 off the seat formed by the annular flange of cutting die 21 this trouble is avoided.

The inner sleeve 30, outer sleeve 27, and the annular die 21 are all standard. To vary the size of the hole in the doughnut for any given weight of doughnut, it is only necessary to substitute for the steel disk valve 22 having the bell shaped valve head 23 a disk valve having a conical topped stem. The opening in a doughnut ring (when cooked) formed by using a disk valve 22 with a conical topping stem, will be larger than the opening in a similar doughnut ring (when cooked) formed by a disk valve having a bell shaped head or stem 23.

*Cycle of operations*

First position. Inner sleeve 30 at the bottom limit of its downward movement is spaced about ¼" above the seat of annular die 21, and in this position the inner sleeve overlaps the ports 29 of outer sleeve 27 by about $\frac{1}{32}$"; aluminum plunger 31 is also on dead center at the extreme lower limit of its stroke. As the cutter continues to operate inner sleeve 30 rotates and roller cam 39 rises in the groove of positive cam 38, raising inner sleeve 30 and moving disk valve 22 upwards towards bevelled cutting edge 35 of annular cutting die 21. Plunger 31 also moves upwards on its suction stroke, but owing to the quick throw of crank arm 66 and the sharp pitch of cam groove 38 inner sleeve 30 and disk valve 22 travel much faster than plunger 31, so that the ports 29 in stationary outer sleeve 27 are partly uncovered by the inner sleeve before said sleeve has risen far enough to cause the upper edge of disk valve 22 to engage the bevelled edge 35 of cutting die 21.

Second position. Inner sleeve 30, disk valve 22, and plunger 31 continue their upward movement, until the lower edge of disk valve 22 is approximately $\frac{3}{16}$" inside the throat of the annular cutting die 21 which is the limit of the upward movement of sleeve 30 and disk valve 22. At the moment that inner sleeve 30 reaches this position, plunger 31 has only completed about one-half of its suction stroke; plunger 31 accordingly continues its upward movement to complete its suction stroke thus drawing dough through the uncovered ports 29 into the throat and lower end of inner sleeve 30.

Third position. Plunger 31 continues to move upwards to complete its suction stroke, but before the suction stroke is completed, inner sleeve 30 begins to move downwards, and when plunger 31 reaches upper dead center at the end of its suction stroke, disk valve 22 is passing bevelled edge 35 of annular die 21 as the disk valve emerges from the throat of the die.

Fourth position. Plunger 31 now moves downwards on its exhaust stroke, and when said exhaust stroke is about one-half completed, disk valve 22 is in its fully open position (substantially as shown in Fig. 1); meanwhile inner sleeve 30 has reached the bottom of its downward travel, and during the downward movement of the sleeve and before it seals the ports 29, some dough displaced by inner sleeve 30 may be forced back through the ports 29 into hopper 20. Plunger 31 now continues its exhaust stroke and expels the plastic dough through the throat of annular cutting die 21 over the peripheral edge of disk valve 22. Inner sleeve 30 and disk valve 22 linger at the limit of their downward movement, while plunger 31 completes its exhaust stroke. This "lingering" is made possible by the shape of the groove of positive cam 38, which is flat at the top and bottom and inclined in the center section of the cam. The cycle of operations continues into the first position of the cycle, and as disk valve 22 again passes upwards into the throat of annular die 21 the ring of dough is released from the relatively thin bevelled edge 35 of cutting die 21 and the cycle of operations is repeated.

As none of the moving parts of the cutter comes in contact with the dough in the hopper 20, all tendency to toughen or punish the dough due to the motion of the moving parts is avoided. Similarly as only an insignificant amount (if any) of the dough drawn into inner sleeve 30 upon the suction stroke of plunger 31, is forced back through ports 29 into hopper 20 as inner sleeve 30 is traveling downwards, any tendency to agitate or toughen the dough in this manner is practically eliminated. The lower face of plunger 31 does not contact the dough in inner sleeve 30 so that any tendency to toughen the dough due to contact with the head of the plunger 31 is also eliminated.

The cutter will continue to operate to make doughnuts of uniform size regardless of the head of dough in hopper 20, as long as there is enough dough in hopper 20 to cover the ports 29 and prevent passage of air therethrough; and as the ports are relatively close to the bottom of hopper 20, and the hopper bottom is tapered to reduce its cross sectional area to a minimum, only a relatively small amount of dough will be left over in the bottom of the hopper after the run of dough has been completed.

After using, all parts which come in contact with the dough may be rapidly removed, washed, and re-assembled, for re-use, by merely unscrewing one screw in collar 37 to free stationary outer sleeve 27 from seat 42, by unscrewing milled bolt 63 to free inner sleeve 30 from oscillating arm 66, and by loosening the hexagon nut on driving rod 54 to allow the U shaped head 58 of operating arm 56 to dis-engage upper and lower collars 59 to free piston rod 33; whereupon the gun unit (Fig. 5) may be removed in one piece, and the sleeves 27, 30 and plunger 31 (Figs. 6 to 8) thereafter disassembled ready for washing. Similarly by loosening locking pin 80 to free web 81 of hopper 20 from split collar 79, the simple hopper 20 may be removed unencumbered by any other mechanical part from the lower arm of supporting bracket 36 ready for washing. To re-assemble the cutter after the parts have been thoroughly washed, the procedure is reversed, whereupon the cutter may be made ready for re-use. Thus the cuttter may be rapidly dis-assembled and re-assembled as often as and whenever necessary by the manipulation of a total of four screws in all, without any change in the timing (or relative adjustment) of the component parts of the gun unit.

What is claimed is:

1. In a doughnut cutter, the combination with a bracket; a hopepr for containing dough, said hopper having an opening in the lower end thereof defining a delivery throat, said hopper being detachably supported by said bracket and bodily removable therefrom, a cutting die extending through said delivery throat; and a gun unit demountably mountable within said hopper as a single unit, said gun unit comprising an outer sleeve having a port in the lower end thereof, said outer sleeve being seatable within said delivery throat to cut off all communication between said hopper and said delivery throat except by way of said port in said outer sleeve, said outer sleeve when thus seated in said delivery throat extending above the upper end of the hopper and being lockable in fixed position relative to said hopper to preclude any possibility of agitation by said sleeve of dough contained in said hopper, an inner sleeve having a disc valve extending beyond its lower end and secured in axial alignment with said sleeve, said inner sleeve being demountably mountable within said outer sleeve so that the inner wall of the outer sleeve cooperates with the outer wall of the inner sleeve to guide the inner sleeve during axial movement relative to the outer sleeve and so that the disc valve cooperates with the cutting die to define a dough extruding outlet and severing device, said inner sleeve being slidable back and forth within said outer sleeve to alternately close said port while moving said disc valve downwards through and in spaced relation to said cutting die to define a dough extrusion outlet and to open said port and draw said disc valve upwards into said cutting die to effect severing of a formation of dough thus extruded, a plunger independently slidably operable within said slidable inner sleeve in timed sequence to draw a charge of dough from said hopper through said open port during the suction stroke of said plunger and to expel said charge of dough through said extrusion outlet during the exhaust stroke of said plunger; of means mounted on the bracket operable to drive said inner sleeve and disc relative to said stationary outer sleeve and cutting die and to drive said plunger relative to said inner sleeve and disc in interdependent timed sequence and in cyclic order, and means for detachably interconnecting said inner sleeve and said plunger piston to said bracket mounted driving means.

2. In a doughnut cutter the combination with a dough hopper having a delivery throat in the bottom thereof; and a portable gun unit comprising a ported outer sleeve adapted to prolong said throat upwards above the dough filling level of the hopper, an inner sleeve having a disc valve depending from its lower end, said inner sleeve being mounted to slide up and down within said outer sleeve with the adjacent surfaces of said inner and outer sleeves in contacting engagement to alternately uncover and cover the port in the outer sleeve while simultaneously drawing said disc valve upwards into and lowering said disc valve downwards out of said delivery throat, and a plunger mounted to slide up and down within said inner sleeve to draw dough from the hopper through the port in the outer sleeve during the upward movement of the inner sleeve, disc valve, and plunger, and to expel dough through the delivery throat during the downward movement of the inner sleeve, disc valve, and plunger; of a stationary bracket comprising, means for demountably supporting the hopper and the gun unit in operative registry, means mounted on the bracket operable to actuate said inner sleeve and said plunger independently and in interdependent timed sequence, and means for rapidly interconnecting said inner sleeve and said plunger with their respective actuating means.

3. A detachably attachable portable gun unit adapted to be insertable as one single unit within the hopper of a doughnut cutter and demountably mountable in registry with the delivery throat of said hopper and bodily removable therefrom without first dis-assembling said gun unit comprising, an outer sleeve ported adjacent its lower end and operable to register with said delivery throat to prolong said throat upwards above the brim of the hopper to cut off all communication between said hopper and said throat except by way of said port, an inner sleeve, a disc valve secured in spaced relation to the lower end of said inner sleeve and in axial alignment therewith, cam mechanism formed upon said inner sleeve, complementary cam mechanism mounted upon said outer sleeve, said inner sleeve and axially aligned disc valve being respectively slidably demountably mountable within said outer sleeve and said delivery throat to effect registration of and positive interaction between said cam and complementary cam mechanisms to unalterably fix and determine the limits of sliding movement of said inner sleeve relative to said outer sleeve thus alternately opening and closing said port in cyclic order while simultaneously drawing said disc valve upwards into and lowering said disc valve downwards out of said delivery throat, and a plunger slidably demountably mountable within said inner sleeve and operable to effect interdependent cyclic movement relative to said inner sleeve so as to draw a batch of dough into said delivery throat via said open port during the suction stroke of said plunger, so as to expel said batch of dough from said delivery throat over said disc valve as a plastic formation during the exhaust stroke of said plunger, and so as to cause said disc valve to cooperate with said delivery throat to sever said plastic formation after the exhaust stroke of said plunger is completed.

4. A doughnut cutter comprising a hopper having an opening in the lower end thereof, an interchangeable annular forming die outlet detachably seated in said opening, a disc valve movable upward into the die outlet from below, the upper end of said die defining an annular seat, an outer sleeve ported adjacent its lower end positioned within the hopper and seated on said seat, said outer sleeve extending upwards to a level above the dough filling level of the hopper, a bodily removable inner sleeve supportably mounted within said outer sleeve for movement relative thereto, said disc valve being connected in axial alignment with the lower end of said inner sleeve and in spaced relation thereto, cam mechanism mounted upon said outer sleeve, complementary cam mechanism mounted upon said inner sleeve, said cam and complementary cam mechanism being inter-engageable to effect rotary sliding movement of said inner sleeve within said outer sleeve and to determine the extent thereof, said movement being sufficient to alternately cover and uncover the ports in the outer sleeve while simultaneously drawing said disc valve into and lowering said disc valve through said die outlet, said cam and complementary cam mechanisms being disengageable to permit the rapid removal of said inner sleeve from said outer sleeve, a plunger slidably demountably mounted within said inner sleeve, a common support for said hopper and said outer sleeve, means mounted on said common support and detachably connectable to said plunger and said inner sleeve to operate said plunger said inner sleeve and said disc valve, and timing means mounted on said support for timing the movements of said plunger said inner sleeve and said disc valve in proper cyclic order.

IRA S. MOSHER.